3,087,967
**PROCESS FOR MANUFACTURE OF BENZALDE-
HYDE FROM BENZAL CHLORIDE**
David E. Graham, Westfield, and Winfred C. Craig, West
Long Branch, N.J., assignors to General Aniline & Film
Corporation, New York, N.Y., a corporation of Delaware
No Drawing. Filed Feb. 17, 1960, Ser. No. 9,189
3 Claims. (Cl. 260—599)

This invention relates to an improved method of producing benzaldehyde from benzal chloride and to the production of simply substituted benzaldehydes from correspondingly substituted benzal chlorides.

We have found that benzal chloride and simply substituted benzal chlorides are readily converted in good yield to benzaldehyde or the correspondingly substituted benzaldehydes respectively by hydrolysis at elevated temperatures with essentially the stoichiometric amounts of water in the presence of catalytic amounts of anhydrous zinc chloride.

In accordance with the present invention, there is added to the benzal chloride a catalytic amount of anhydrous zinc chloride, preferably about 0.3% by weight. This mixture is then heated slightly above 100° C., preferably 105–120° C. and maintained at this reaction temperature with good agitation in order to disperse the anhydrous zinc chloride throughout the benzal chloride while adding essentially the stoichiometric amounts of water required for hydrolysis of the benzal chloride to benzaldehyde, an excess of preferably 5–10% of water over the theoretically required amount being preferably used. The addition of the water is effected at a slow and regulated rate, not in excess of that at which it will react, since if excess water accumulates in the reaction mixture, as is evidenced by the reaction mixture becoming turbid, the water will tend to dissolve the catalyst and retard the reaction. Therefore, during the addition of water in the case turbidity of the reaction mixture is noticeable or the evolution of HCl slows down, further addition of water should be stopped and the reaction mixture maintained at the reaction temperature, preferably 105–135° C., until the reaction mixture again becomes clear and strong HCl evolution takes place. On completion of the reaction, the mixture is preferably maintained at reaction temperature until all HCl has been removed, which removal may be expedited by passing nitrogen or other inert gas through the reaction product. Following the removal of the HCl, the benzaldehyde is preferably recovered by vacuum distillation.

In practicing the present invention, it has been found that the presence of small amounts of benzyl chloride and/or benzotrichloride does not interfere with the reaction since under the conditions used, the benzyl chloride is condensed to a non-volatile resin which will remain behind in the still pot residue obtained as part of the distillation of the benzaldehyde, while any benzotrichloride which may be present will be hydrolyzed under the reaction conditions to benzoic acid which in turn, likewise, will remain behind in the still pot residue obtained as part of the distillation of the benzaldehyde. Thus by the process of the present invention a good yield of benzaldehyde of high purity is obtained from the benzal chloride employed even though this benzal chloride may contain small amounts of the mono- or tri-chlorinated product. It should be noted that careful control of the temperature during the reaction is important since at higher temperatures the benzal chloride will be polymerized. Likewise, the use of greater than catalytic amounts (more than 1% by weight) of zinc chloride favors the polymerization of the benzal chloride. The still pot residue remaining after distillation of the benzaldehyde which contains the zinc chloride, and also some benzoic acid if benzotrichloride was present in the starting mixture, may advantageously be employed in the hydrolysis of benzotrichloride.

The details of the present invention will be apparent from the following specific examples.

*Example 1*

To 700 parts by weight of distilled benzal chloride there was added 2 parts by weight of anhydrous zinc chloride and the two were mixed thoroughly with stirring while heating to 105–110° C. As soon as the reaction mixture was at 105–110° C. the addition of water was begun at a slow rate, while maintaining the reaction temperature at 110–120° C. The addition of water was continued until a total of 85 parts by weight of water had been added (approximately 5% excess) at which time the evolution of hydrogen chloride ceased. Reaction temperature was maintained for another hour to be sure that all the HCl had been removed, and the benzaldehyde was then removed by vacuum distillation. The yield of benzaldehyde recovered on distillation was 95% of theory and the purity of the product better than 96.5%

As previously stated, the process of the present invention is also applicable to the production of simply substituted benzaldehydes by hydrolysis of the correspondingly substituted benzal chlorides as will be apparent from the following specific example illustrating the application of the present invention to the hydrolysis of o-chloro-benzal chloride to o-chloro-benzaldehyde.

*Example 2*

To 587 parts by weight of o-chloro-benzal chloride in a stirred glass-lined reaction kettle, there was added 1.2 parts by weight of anhydrous zinc chloride and the mixture heated to 125° C. at which time there was started the slow addition of 56 parts by weight of water (5% excess). During the addition of the water stirring was continued and HCl evolution occurred. The temperature was maintained at 125–130° during the addition of the water which took 5 to 6 hours. When all the water had been added, the reaction mixture was held at 125–130° C. for about ¾ of an hour until there was no more evolution of HCl. The product was then distilled at 10 mm. pressure (B.P.$_{10}$=85—86° C.). The rate of crude product obtained was 418.6 parts by weight or 99.4% of theory. The o-chloro-benzaldehyde recovered on distillation amounted to 407.6 parts by weight or 96.7% of theory. Analysis of both the crude product and the distilled product were as follows:

|  | Crude | Dist. | Theo. |
|---|---|---|---|
| Total chlorine | 25.59 | 24.68 | 25.25 |
| Inorganic chlorine | 0.23 | nil | nil |
| Organic chlorine | 25.36 | 24.68 | 25.25 |
| Side chain chlorine | 0.65 | 0.1 | nil |
| Percent Purity (M.W.140.5) | 96.0 | 98.7 | 100.00 |
| Percent o-chlorobenzoic acid (M.W. 156.6) | 0.36 | 0.3 | |
| S.P. | below 3.5° C. | 8.9–9.7° C. | |

In a manner similar to that described in Example 2, p-chlorobenzaldehyde was prepared from p-chlorobenzal chloride, and 2,6-dichlorobenzaldehyde was prepared from 2,6-dichlorobenzal chloride. Likewise, o-, m-, and p-tolualdehyde have been prepared from a α-α-dichloro derivatives of o-, m-, and p-xylene respectively.

We claim:
1. The method of producing benzaldehydes selected from the group consisting of benzaldehyde, o-chlorobenzaldehyde, p-chlorobenzaldehyde, 2,6-dichlorobenzaldehyde, o-tolualdehyde, m-tolualdehyde and p-tolualde- hyde which comprises heating the corresponding α,α-dichloro compound selected from the group consisting of benzal chloride, o-chlorobenzal chloride, p-chlorobenzal chloride, 2,6-dichlorobenzal chloride, α,α-dichloro-o-xylene, α,α-dichloro-m-xylene and α,α-dichloro-p-xylene containing a catalytic amount of anhydrous zinc chloride to temperatures slightly above 100° C. and adding water to the thus heated mixture at substantially the rate at which it reacts with the α,α-dichloro compound whereby the corresponding benzaldehyde is produced.

2. The method as defined in claim 1 wherein the α,α-dichloro compound specified is benzal chloride and zinc chloride is employed in an amount up to about 1% whereby benzaldehyde is produced.

3. The method as defined in claim 1 where the α,α-dichloro compound specified is o-chloro-benzal chloride and zinc chloride is employed in an amount up to about 1% whereby o-chlorobenzaldehyde is produced.

References Cited in the file of this patent

UNITED STATES PATENTS 2,816,144    Harris _____ Dec. 10, 1957

OTHER REFERENCES

Shintani: Chemical Abstracts, vol. 52 (1958), p. 9210. (Copy in Lib.)